United States Patent [19]
Williams

[11] 3,776,358
[45] Dec. 4, 1973

[54] CAB FOR AGRICULTURAL TRACTORS AND THE LIKE

[76] Inventor: Cyril G. Williams, Box 246, Plains, Mont.

[22] Filed: Apr. 12, 1972

[21] Appl. No.: 243,186

[52] U.S. Cl............. 180/84, 15/250.01, 98/2.14, 98/96, 296/28 C, 296/91
[51] Int. Cl............ B62d 25/16, B60j 9/04
[58] Field of Search............ 180/84, 89 R; 296/28 C, 91, 102; 98/2, 2.14, 2.04, 3, 28, 36, 99, 9, 96; 52/171; 15/250.01, 250.05

[56] References Cited
UNITED STATES PATENTS

| | | | |
|---|---|---|---|
| 874,962 | 12/1907 | Hughes | 180/84 |
| 1,688,104 | 10/1928 | Bang | 296/91 |
| 2,199,883 | 5/1940 | Ishiwata | 180/84 |
| 2,484,685 | 10/1949 | Burdick et al. | 296/28 C X |
| 2,817,281 | 12/1957 | Schwan et al. | 296/28 C X |
| 3,126,810 | 3/1964 | Karlsson et al. | 98/36 |
| 3,532,377 | 10/1970 | Grasseler | 296/28 C |
| 3,696,732 | 10/1972 | Rogers | 296/91 X |

FOREIGN PATENTS OR APPLICATIONS 229,390  5/1960  Australia............... 98/36

Primary Examiner—Benjamin Hersh
Assistant Examiner—Leslie J. Paperner
Attorney—Lawrence L. Colbert

[57] ABSTRACT

A cab for the suppression and control of dust protects the operator while furnishing adequate ventilation and cooling and assures good visibility by directing continuous streams of air over the exterior faces of all windows. The cab features hollow walls at the sides and rear and an overhead fan compartment with ventilation controls. The fan may be driven from the tractor hydraulic system.

12 Claims, 8 Drawing Figures

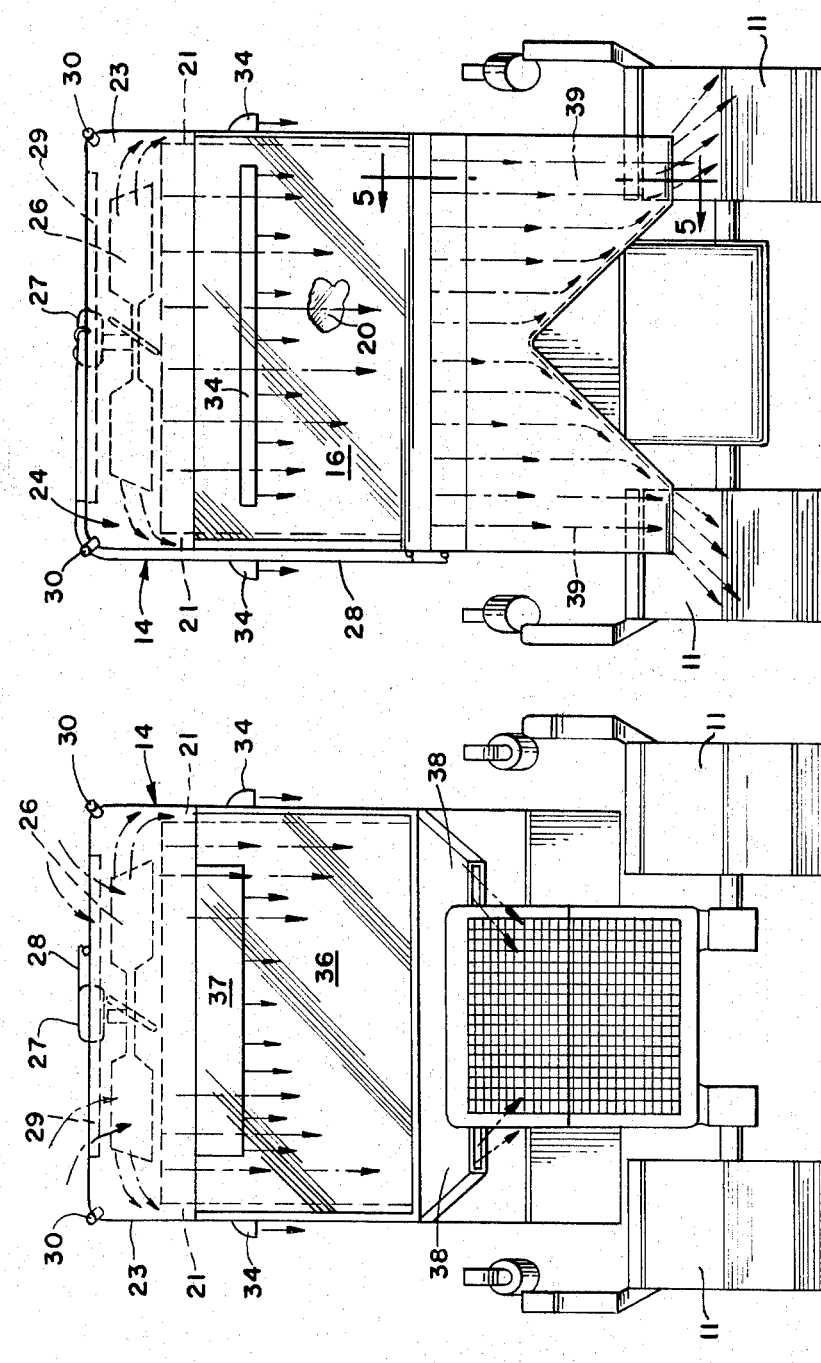

CAB FOR AGRICULTURAL TRACTORS AND THE LIKE

BACKGROUND OF THE INVENTION

There has long been recognized a need to suppress and control swirling dust raised by farm tractors, self-propelled combines and other agricultural machinery. The choking dust surrounding such machines during operation can be a serious health hazard to the operator and can reduce visibility almost to zero, in some cases. The existence of the problem has been recognized in the prior art and some prior art devices have been proposed to cope with the problem of dust suppression. One such example in the prior patented art is U.S. Pat. No. 3,126,810 covering an agricultural combine having means to produce a downward stream of air around the operator. While such a device is unquestionably helpful, it is not adequate in providing the degree of operator protection needed in most cases, or the degree of clear visibility necessary for safe operation of the vehicle or machinery. Additionally, the prior art does not make provision for suppressing dust thrown up by the wheels or crawler tracks of tractors which is the prime source of swirling dust in the open field. Neither does the prior art provide for forcing dust away from the tractor engine where dust clouds can become so dense as to almost choke off the engine air intake while causing excessive engine wear.

With the above in mind, the present invention has for its aim a complete solution of the problem of dust control and suppression in connection with farm machinery while simultaneously fully enclosing and protecting the operator in a reasonably cool ventilated compartment and providing good visibility in all directions. Additionally, the invention continuously directs air blasts down onto the tractor wheels or treads to control the dust at its source and continuously directs sheets of air downwardly over the exterior of the transparent walls or windows of the cab structure to clear the same for good visibility. While all of this is taking place, additional air currents are forced over the tractor engine to clear and suppress dust.

All of the above is accomplished by the use of a compact operator cab having hollow walls at least on its two sides and rear, said walls constructed to a large extent from transparent or tinted material, such as plexiglas. The roof of the cab forms a fan compartment with a filter and ventilation controls in the cab ceiling. Air compressed by the fan is directed downwardly through the hollow walls and through nozzle means at the bottom of the cab onto the wheels or treads of the vehicle and onto the engine. Louver scoops on the walls of the cab intercept downwardly flowing air in the hollow walls and divert part of such air across the outside window surfaces to continuously clean the same. Movement of air through the hollow walls serves also to cool the interior of the cab.

Other features and advantages of the invention will become apparent during the course of the following detailed description.

BREIF DESCRIPTION OF DRAWING FIGURES

FIG. 3 is a front elevation of the invention.

FIG. 4 is a rear elevation thereof.

FIG. 5 is an enlarged fragmentary vertical section through the rear wall of the cab and associated lower end nozzle means.

DETAILED DESCRIPTION

Figure 1:
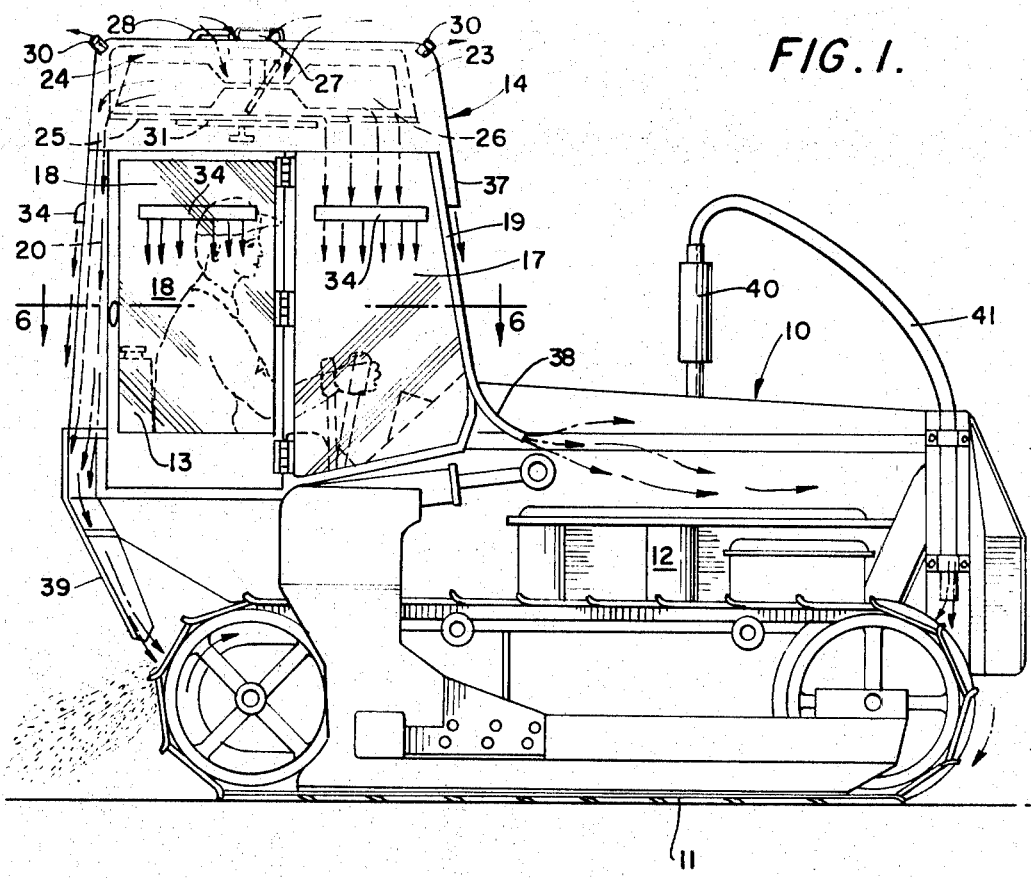
FIG. 1 is a side elevation of a track-laying farm tractor equipped with the cab embodying invention.
Figure 2:
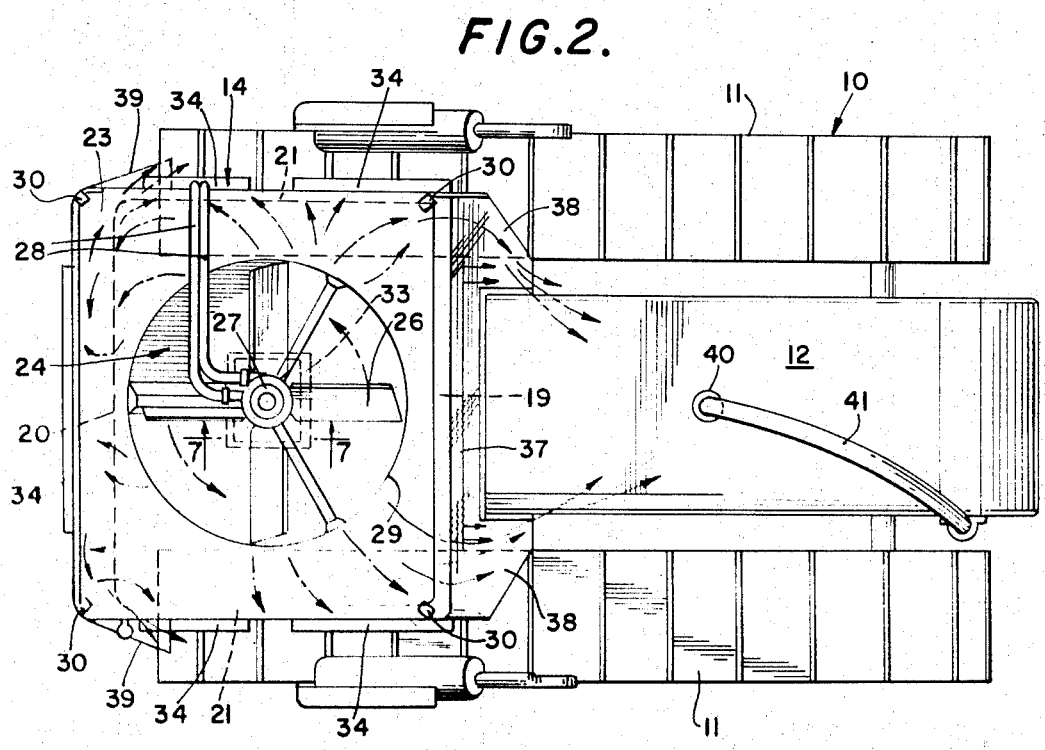
FIG. 2 is a plan view of the tractor and cab shown in FIG. 1.

Referring to the drawings in detail wherein like numerals designate like parts, the numeral 10 designates a tractor of the crawler tread type having a pair of crawler treads 11 on opposite sides of the engine 12, the tractor having an operator's seat 13 near the rear thereof, as indicated in FIG. 1. The structure of the tractor 10 is entirely conventional and need not be described in any further detail for a proper understanding of this invention.

The subject matter of the invention resides in an operator cab 14 which is generally box-like and constructed to be firmly mounted on the framework of the tractor 10 and/or on portions of the tractor rear axle. Preferably, rubber mountings are employed where the cab is seated on the tractor frame to avoid vibration so that the interior of the cab will be quiet. The details of the cab mounting are not shown in the drawings since these may vary from machine-to-machine and because such mounting means and variations are well within the knowledge of those skilled in the art. Suffice it to say that the compact box-like cab 14 fits over and encloses the operator's seat 13 and all adjacent controls and fully encloses the operator at the top, bottom and on all sides.

Preferably, the front, rear and side walls of the cab 14 are constructed over major portions of their areas from plexiglas or the like in clear or tinted form so as to provide unrestricted visibility horizontally in all directions. More particularly, the cab 14, FIG. 6, has hollow front, rear and side walls 15, 16 and 17, formed by spaced panels of plexiglas including suitable framing for the plexiglas sheets. One hollow wall 17 includes a hollow hinged door 18 at the rear portion thereof providing ready access and egress to and from the cab. The hollow wall construction of the cab 14 provides within each wall a vertically extending chamber or passage 19, 20 and 21 for forced air as will be further described. The main frame of the cab 14 is constructed of sturdy pipe or the like including corner posts 22, and this main frame is sufficiently sturdy to protect the operator in an upset situation.

The top of the cab 14 is formed by a shroud 23 preferably formed of sheet metal and suitably fitted onto the side walls of the cab so as to be dust-proof and substantially air-tight. This shroud 23 has an interior fan chamber 24, the bottom of which is closed by a ceiling panel 25 above the head of the operator. The shroud chamber 24 contains a vertical axis rotary blower or fan 26 having a fluid driving motor 27, connected by supply and exhaust hoses 28 with the conventional hydraulic system of the tractor. The top wall of the shroud 23 has an opening or grid 29 for the admission of air to the fan chamber, and preferably the shroud has corner 45° air discharge nozzles 30 which direct air outwardly and away from the central intake 29 so as to prevent the entry of dust into the top of the fan chamber.

The ceiling panel 25 of shroud 23 has a manually adjustable louver grid 31 therein operated by an overhead handle 32. This louver grid is covered by a readily replaceable filter pad 33. By this means, controlled ventilation of the interior of cab 14 is achieved and relatively clean air enters the top of the cab and flows downwardly around the operator in the desired degree. All of the cab hollow wall chambers 19, 20 and 21 communicate at their tops with the fan chamber 24 and receive air under pressure flowing downwardly therefrom. In this manner, the four side walls of the cab continuously receive downwardly flowing cooling air through the hollow wall passages during operation of the invention. While this is taking place, a portion of the air stream in each chamber 19, 20 and 21 is intercepted by an inside-to-outside scoop louver 34 so that part of the air in each hollow wall is diverted from the hollow wall interior to the adjacent outside window surface 35 as shown particularly in FIG. 5. This produces on each transparent side wall of the cab a continuous air washing or scrubbing action which very effectively maintains the windows of the cab free of collecting dust so as to maintain good visibility in all directions. The arrows shown in the drawings schematically show the flow of air through the several hollow walls of the cab and across its exterior window surfaces. The front window or windshield 36 of the cab is cleared of dust in a slightly different manner, namely, by a depending air nozzle 37 leading from the forward side of the shroud 23 at the front of the cab. The cleaning action is the same as that afforded by the scoop louvers 34.

While all of the above-described air flow is taking place within the cab interior, thorugh its hollow side walls and across the exterior faces of its windows, the major air streams are continuously discharging from the bottoms of the wall chambers 19, 20 and 21 which are essentially open. At the front chamber 19, this downward air discharge is contained and channeled by divided nozzles 38 which are also curved forwardly, FIG. 1, and lie on opposite sides of the engine 12. As shown by the arrows, the nozzles 38 constantly deliver streams of air along and over the tractor engine to clear the same of dust during operation of the equipment. Additionally, air discharging at the bottom of the rear wall passage 20 is directed by divergent nozzles 39 or deflectors into two separate air streams which impinge upon the two treads 11 at an angle near the rear and tops of these treads to prevent dirt and dust from being carried upwardly by the treads and forwardly by the top runs thereof. This constitutes a very significant feature of the invention for suppressing a main source of swirling dust normally picked up by the treads or wheels of tractors.

An additional feature resides in diverting the engine exhaust from the usual stack 40 through a hose 41 which leads downwardly to the tops of the treads 11 at the front of the tractor. This prevents the rising exhaust from being sucked into the fan chamber 24. Additional air venting downwardly along the sides of the cab from the side walls passages 21 will impinge on the tops of the treads 11 to further suppress dust.

It may be seen that the invention cools and ventilates the operator, maintains clear vision in all directions and suppresses and controls dust to the maximum possible extent, instead in a rather haphazard manner as taught by the prior art.

Figure 8:
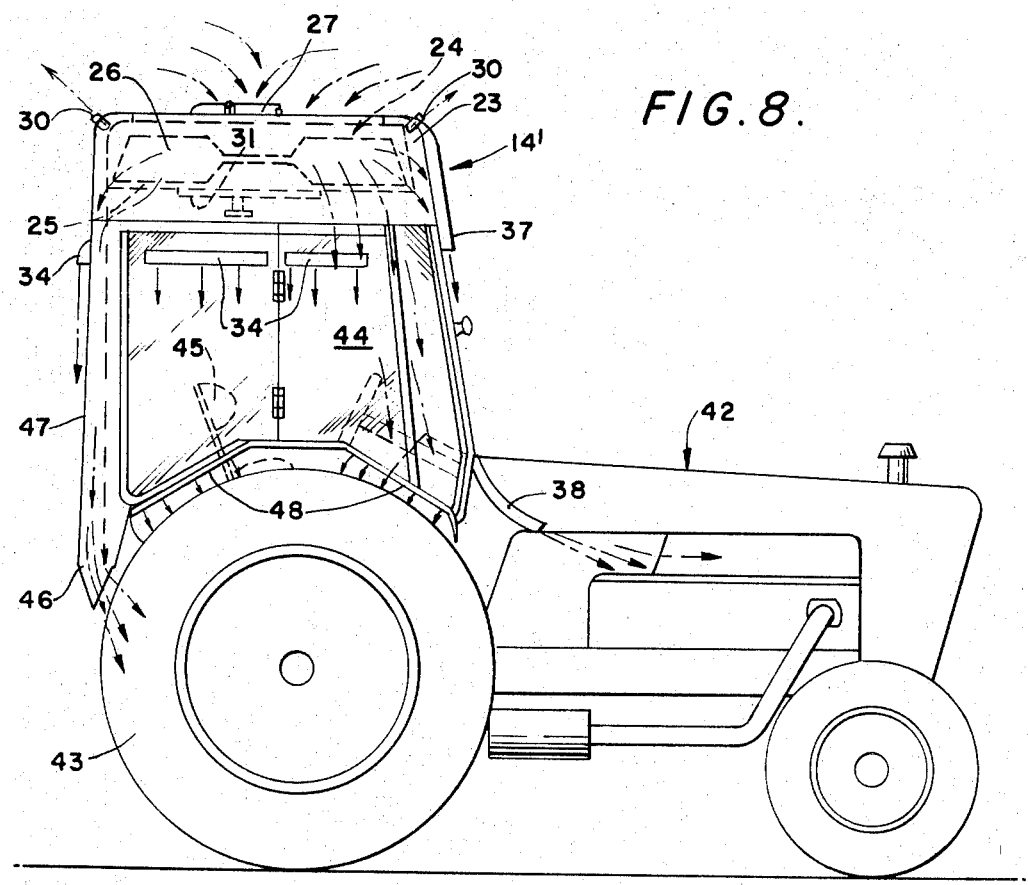
FIG. 8 is a side elevation of the invention applied to a wheeled farm tractor.

FIG. 8 illustrates the invention applied to a conventional wheeled farm tractor 42, and the only difference between the invention in this form and the prior embodiment is that the cab 14' is shaped slightly differently at its bottom and on its opposite sides to properly receive the large rear tractor wheels 43. Referring to FIG. 8, the cab 14' may have the identical shroud 23 with internal fan 26 and associated elements. The door 44 of the cab 14' is located forwardly on one side of the structure with relation to the operator's seat 45. The cab 14' possesses the identical window clearing nozzle means 34 and 37 described in connection with the previous embodiment and the identical forward nozzle means 38 for clearing the tractor engine of excessive dust.

Figure 6:
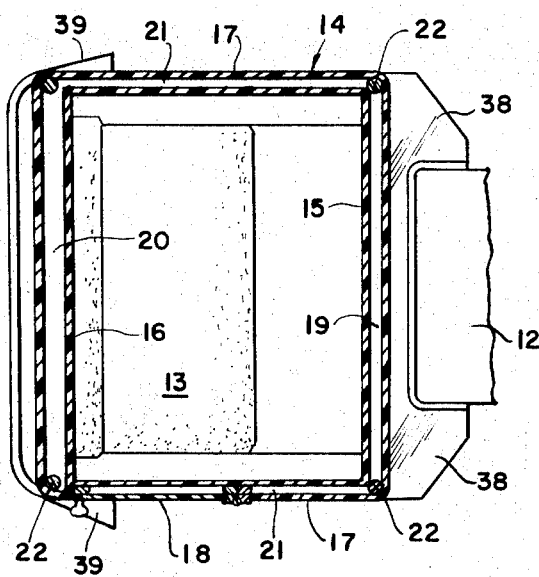
FIG. 6 is a horizontal section taken on line 6—6 of FIG. 1.
Figure 7:
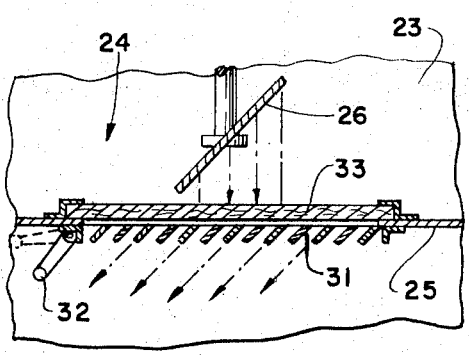
FIG. 7 is an enlarged fragmentary vertical section through the cab ceiling immediately below the overhead fan.

The forward, side and rear walls of the cab 14' are hollow and possess vertical forced air passages substantially identical to the described passages 19, 20 and 21 shown in FIG. 6. The rear air nozzle means 46 at the lower end of the rearward cab hollow wall 47 directs a blast of air downwardly at an angle onto each rear wheel 43 to prevent these wheels from picking up excessive dust. The bottom open ends of the cab side wall passages are inclined at 48 in the modified form of the invention to direct air onto the tops of the large rear wheels. In all other respects, the invention in FIG. 8 is constructed the same as in the prior embodiment and operates in the same manner to achieve the same benefits.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A cab for self-propelled agricultural machines comprising a cab body adapted to fit over the operator's seat and adjacent controls of said machine, said cab body adapted to be fixedly secured to said machine and said cab body having hollow side walls which are at least in part transparent, means forming a fan chamber at the top of the cab body having an air intake and said chamber communicating with the interiors of said hollow side walls so that air may be forced downwardly therethrough, air discharge nozzle means on the lower end of the cab body communicating with at least some of the hollow side wall interiors and directing air onto the traction elements of the machine to prevent such elements from carrying dust and onto the engine of the machine to clear the engine of dust, and additional nozzle means on the cab body receiving air from the interiors of the hollow side walls and delivering the air across the outer surfaces of the transparent portions of the side walls to clear the same of dust.

2. The structure of claim 1, and a rotary fan in said fan chamber, and fluid motor means drivingly connected to said fan and adapted for connection with a conventional pressurized fluid system of said machine.

3. The structure of claim 1, and said additional nozzle means comprising a scoop louver on each side and rear wall of the cab body including an upwardly directed scoop blade projecting into the air stream in the interior of said wall and a downwardly directed louver on the outside of said wall directing air downwardly over the outer surface of said wall after said air is diverted from the air stream in the interior of the wall.

4. The structure of claim 1, and said cab body being box-like and rectangular in horizontal cross section and having four hollow side walls, and means forming an operator's door on one side wall of the cab body.

5. The structure of claim 1, and said means forming said fan chamber comprising a hollow shroud on the top of the cab body, and a vertical axis rotary bladed fan mounted in the interior of said shroud, the margins of said shroud communicating with the tops of said hollow cab body side walls and delivering air downwardly therethrough.

6. The structure of claim 1, and a ceiling panel in the interior of the cab body constituting the bottom wall of said fan chamber and having adjustable ventilator means mounted thereon in ready reach of an operator of said machine in said cab.

7. The structure of claim 6, and a filtering element on said ventilator means enabling the machine operator to receive clean air from said fan chamber.

8. The structure of claim 1, and said air discharge nozzle means on the lower end of the cab body comprising a pair of divergent nozzle extensions depending from the rear of the cab body and receiving air directly from the interior of the hollow rear wall of the cab body and funneling such air in two streams onto the traction elements of the machine.

9. The structure of claim 8, and said air discharge nozzle means additionally comprising a divided nozzle on the front of the cab body directing two streams of air forwardly and generally horizontally over the engine of said machine.

10. The structure of claim 9, and said machine comprising a farm tractor.

11. The structure of claim 10, and said tractor comprising a wheeled tractor including large rear wheels, and the side walls of the cab body being contoured at their bottoms to fit around the top portions of the rear wheels in closely spaced relation so that air from the interiors of the side walls may be directed onto the tops of said wheels around a considerable portion of the wheel circumferences.

12. A cab for tractors and the like comprising a cab body unit attachable fixedly to a tractor and covering the operator's seat and adjacent tractor controls, said cab body having hollow front, side and rear walls which are at least in part transparent, a covering shroud forming the top of the cab body and having a fan chamber communicating with the tops of the interiors of said hollow walls, said shroud having an air intake opening and an adjustable filtered air outlet leading into the chamber of the cab occupied by the operator, the lower ends of the hollow cab body walls forming air outlets to direct air downwardly around the perimeter of the cab body to control and suppress dust, and air deflector means on the cab body for diverting air from the interiors of said hollow walls and directing such diverted air downwardly over the outer faces of the transparent portions of said walls to clean the same.

* * * * *